No. 612,391. Patented Oct. 18, 1898.
G. F. BALLOU.
COPYING PRESS.
(Application filed Dec. 11, 1897.)
(No Model.)
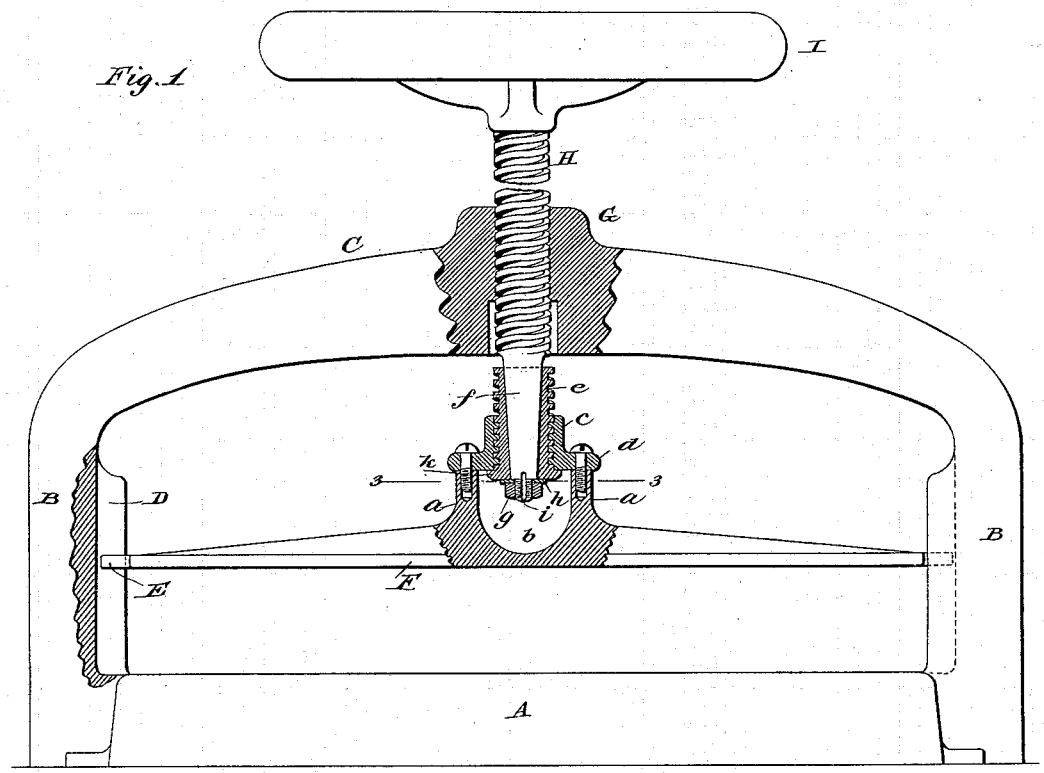
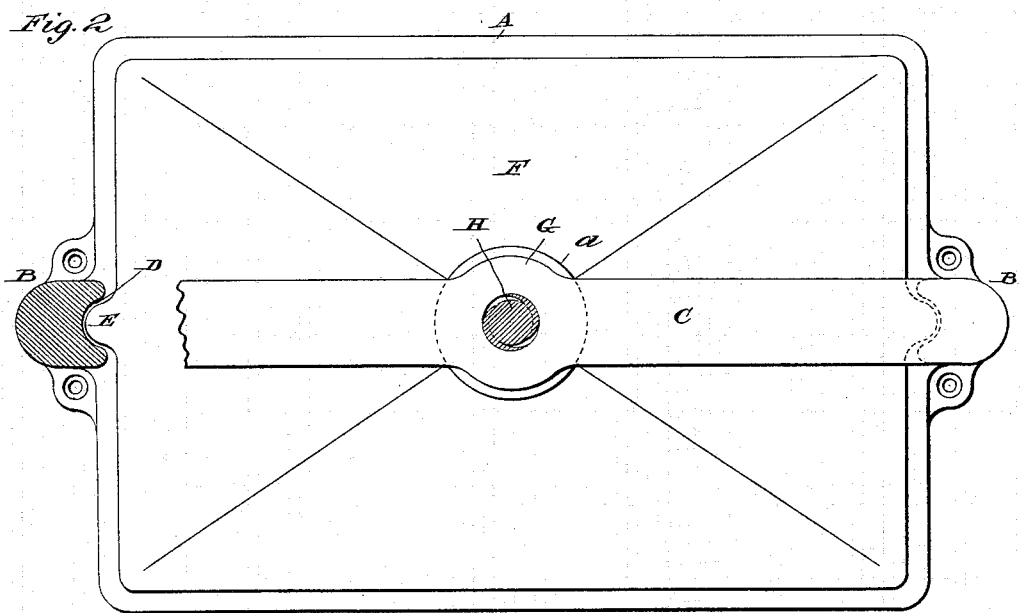
Witnesses:
Jas. F. Coleman
Jno. R. Taylor
Inventor
George F. Ballou
by Richard N. Dyer
Att'y.

UNITED STATES PATENT OFFICE.

GEORGE F. BALLOU, OF NEWARK, NEW JERSEY, ASSIGNOR TO ALBERT B. DICK, OF CHICAGO, ILLINOIS.

COPYING-PRESS.

SPECIFICATION forming part of Letters Patent No. 612,391, dated October 18, 1898.

Application filed December 11, 1897. Serial No. 661,529. (No model.)

*To all whom it may concern:*

Be it known that I, GEORGE F. BALLOU, a citizen of the United States, residing at Newark, in the county of Essex and State of New Jersey, have invented a certain new and useful Improvement in Copying-Presses, of which the following is a specification.

The object of my invention is to produce a copying-press employing two plates, between which the book or other object is compressed and which are capable of two distinct rates of relative movement, the plates being caused to approach each other at a relatively fast rate of movement until the object to be compressed is firmly engaged between said plates, and the plates being subsequently approached toward each other to compress said object at a relatively slow rate of movement, whereby a very much greater compressive effect may be produced upon said object with the same expenditure of energy, or the same compressive effect may be exerted upon said object with a very much smaller expenditure of energy than is possible in those presses wherein the plates are caused to approach each other always at the same rate of relative movement.

By means of my invention I am enabled to actuate one of the plates of a copying-press at a relatively rapid rate of movement until the object to be compressed is engaged by the plates and to then actuate said plate at a relatively slow rate of movement, whereby the compressive effect is produced. By my invention I provide simple and effective means for this purpose and which at the same time will be entirely automatic in operation.

Broadly stated, my invention consists in combining with the ordinary screw-threaded shaft a differential screw, by means of which when in operation the compressive effect of the screw-threaded shaft will be very greatly increased. Preferably the differential screw referred to comes into play automatically when the object to be compressed is firmly engaged between the two plates; but it will be possible to bring said differential screw into operation by hand at any time in the operation of the press.

In carrying out my invention I provide, preferably, the upper plate of a copying-press with a screw-threaded collar permanently secured to the same and mount in said collar a differential screw-sleeve, the pitch or lead of which is slightly greater than the pitch or lead of the screw-shaft of the press, and I provide said screw-shaft at its lower end with a conical or tapered portion engaging the bore of said sleeve and adapted when the resistance of the object is sufficiently great to rotate the differential sleeve by friction, causing said sleeve to move downward with respect to its collar, and thereby decreasing the rate of movement of the upper plate and correspondingly increasing the power which is applied to the same. Instead of providing for an automatic engagement between the screw-shaft and the differential screw-sleeve, as explained, it will be possible to provide for a manual engagement between those elements when the upper plate has been moved into contact with the book or other object, although manifestly an automatic operation is desirable.

In order that my invention may be better understood, attention is directed to the accompanying drawings, forming a part of this specification, in which—

Figure 1 is a side elevation, partly in section, of my improved copying-press; Fig. 2, a plan view of the same, showing the screw-shaft in section; and Fig. 3, a section on the line 3 3 of Fig. 1.

In all of the above views corresponding parts are represented by the same letters of reference.

A represents the ordinary bed-plate of the copying-press, upon which the book or other object is placed.

B B are the usual side frames, which in this instance are cast integral with the bed-plate A and which are connected at their upper ends by a heavy bridge-piece C, cast integral with said frames. In the drawings I show the side frames B provided each with a vertical groove D therein, in which works a lug or ear E of the upper plate F and by which the proper vertical travel of said upper plate will be secured. The bridge-piece C is provided at its center with a boss G and is screw-threaded for the reception of the ordinary screw-shaft H, which in this instance is rotated by a suitable hand-wheel I, as is common. The upper plate F is provided with a cast rim $a$ at its central part, forming a socket or depression $b$ within said rim. Carried on the rim $a$ is a socket $c$, having an integral flange $d$, which is screwed or bolted to the rim $a$. The socket $c$ is screw-threaded on its interior, as shown. Engaging with said screw-threaded socket is a differential screw-sleeve $e$, the threads of which are slightly finer than the threads of the screw-shaft H. In the particular instance illustrated I illustrate the screw-shaft H as provided with threads of two per inch lead and the differential screw-sleeve $e$ as being provided with threads of two and one-eighth per inch lead; but manifestly the threads of the shaft and sleeve may vary to a greater or less extent. The direction of the threads both of the screw-shaft and of the sleeve is the same, both being shown as double right-hand threads.

When it is desired that the device shall be automatic, the screw-shaft H may be provided at its lower end with a conical or tapered portion $f$, which engages the bore of the differential screw-sleeve $e$, and the friction between these parts is sufficient when a certain period in the operation has been reached to cause the differential screw-sleeve $e$ to be rotated with the screw-shaft H, although normally this operation does not take place, as will be explained.

By making the threads of the sleeve $e$ and collar $c$ with a slight play between them the upper plate F will be free to accommodate itself to any small inequalities in the book or other object to be compressed; but manifestly such a result may be accomplished in many other ways.

The lower end of the screw-shaft H is provided with a nut $g$ thereon, between which and the differential screw-sleeve $e$ is interposed a washer $h$. The lower end of the screw-shaft H is provided with a vertical slot $i$ therein, and the washer $h$ is provided with a stud $j$, (see Fig. 3,) which engages with the said slot and by which the washer will be turned with the screw-shaft to prevent the accidental loosening of the nut $g$. The differential screw-sleeve $e$ is provided at its lower end with an enlarged flange $k$, which when said sleeve has been elevated to its extreme limit engages with the collar $c$. With the device illustrated the weight of the upper plate forces the differential screw-sleeve $e$ onto the washer $h$ and may actually separate the bore of said sleeve from the tapered portion $f$ of the screw-shaft. Ordinarily, however, it is not necessary that a positive separation between these elements should take place, since it is only necessary that the friction between these parts should be sufficiently reduced to prevent the differential screw-sleeve from being rotated during the preliminary or rapid movement of the plate.

The operation of the device is as follows, the parts being normally in the position shown: The copying-book or other object is placed on the bed-plate and the hand-wheel I is rotated, moving the screw-shaft H relatively to the boss G and allowing the upper plate F to move downward, the friction between the differential sleeve $e$ and the tapered portion $f$ of said screw-shaft being insufficient to rotate the screw-sleeve. When, however, the upper plate comes into engagement with the book or other object, the downward movement of the screw-shaft causes its tapered lower end to engage tightly with the sleeve $e$, and the friction between these parts will rotate the said differential sleeve. This rotation of said sleeve moves it with respect to the collar $c$, and hence to the extent of that movement reduces the rate of travel of the upper plate. Hence the pressure which will be applied to said plate will be increased accordingly. Upon reversing the movement of the screw-shaft H the friction between its tapered lower end and the sleeve $e$ will rotate the latter until the flange $k$ comes into engagement with the lower end of the collar $c$, and said sleeve will be prevented from rotating farther. By thus holding said sleeve against rotation the further movement of the screw-shaft H disengages its tapered lower end from the sleeve and relieves the friction between the parts, whereupon the upper plate will be supported upon the washer $h$, and the continued movement of the screw-shaft H will then elevate said upper plate at its maximum rate of movement.

Having now described my invention, what I claim as new, and desire to secure by Letters Patent, is as follows:

1. In a copying-press, the combination of a bed-plate, a movable plate, a screw-shaft for operating said movable plate, a screw-threaded collar carried by said movable plate, a differential screw-sleeve in said collar, and connections between said differential screw-sleeve and the screw-shaft for operating said sleeve when the object to be compressed has been engaged between said plates, substantially as set forth.

2. In a copying-press, the combination of a bed-plate, a movable plate, a screw-shaft for operating said movable plate, a screw-threaded collar carried by said movable plate, a differential screw-sleeve in said collar, and connections between said differential screw-sleeve and the screw-shaft for automatically operating said sleeve when the object to be compressed has been engaged between said plates, substantially as set forth.

3. In a copying-press, the combination of a bed-plate, a movable plate, a screw-threaded collar carried by said movable plate, a differential screw-sleeve in said collar, and a screw-shaft engaging said sleeve and adapted to operate the same when the object to be compressed has been engaged by said plates, substantially as set forth.

4. In a copying-press, the combination of a bed-plate, a movable plate, a screw-threaded collar carried by said movable plate, a differential screw-sleeve mounted in said collar, and a screw-shaft having a tapered lower end engaging said differential sleeve, substantially as set forth.

5. In a copying-press, the combination of a bed-plate A, a movable plate F, a screw-threaded collar c carried by said movable plate, a differential screw-sleeve e mounted in said collar, a limiting-flange k for said sleeve, and a screw-shaft H coöperating with said sleeve, substantially as set forth.

6. In a copying-press, the combination of a bed-plate A, a movable plate F, a screw-threaded collar c carried by said movable plate, a differential screw-sleeve e mounted in said collar, a limiting-flange k for said sleeve, and a screw-shaft H automatically coöperating with said sleeve, substantially as set forth.

7. In a copying-press, the combination of a bed-plate A, a movable plate F, a screw-threaded collar c carried by said movable plate, a differential screw-sleeve e mounted in said collar, a limiting-flange k for said sleeve, and a screw-shaft H having a tapered lower end automatically coöperating with said sleeve, substantially as set forth.

8. In a copying-press, the combination of a bed-plate A, a movable upper plate F, a rim a on said upper plate, a screw-threaded collar c carried by said rim, a differential screw-sleeve e in said collar, and a screw-shaft H having a tapered lower end engaging said sleeve and adapted to rotate the same by friction, substantially as set forth.

This specification signed and witnessed this 17th day of December, 1897.

GEO. F. BALLOU.

Witnesses:
EUGENE CONRAN,
JNO. R. TAYLOR.